(No Model.)

I. W. HOYER.
COMPOSITE PLATE FOR SAFES.

No. 498,058. Patented May 23, 1893.

Witnesses:
R. Schleicher
A. V. Groupe

Inventor:
Isaiah W. Hoyer
by his Attorneys
Howson & Howson

UNITED STATES PATENT OFFICE.

ISAIAH W. HOYER, OF PHILADELPHIA, PENNSYLVANIA.

COMPOSITE PLATE FOR SAFES.

SPECIFICATION forming part of Letters Patent No. 498,058, dated May 23, 1893.

Application filed December 19, 1892. Serial No. 455,631. (No model.)

*To all whom it may concern:*

Be it known that I, ISAIAH W. HOYER, a citizen of the United States, and a resident of Philadelphia, Pennsylvania, have invented certain Improvements in Composite Plates for Safes and Vaults, of which the following is a specification.

My invention relates to plates such as are used in constructing burglar-proof vaults or safes, which plates consist of one or more plies of iron or low steel alternating with one or more plies of high carbon steel, the object of my invention being to so construct such multiple-ply plate as to render the same homogeneous in character and to interfere with the formation of openings through the plate. This object I attain in the manner hereinafter set forth, reference being had to the accompanying drawings, in which—

Figure 1:
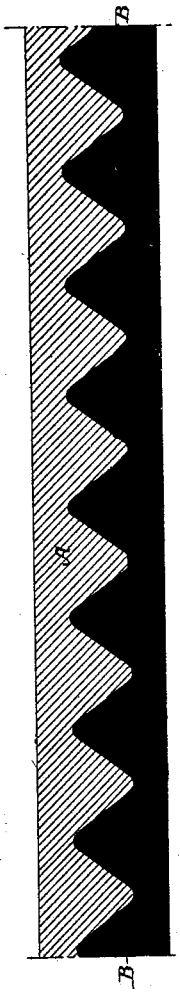
Figure 2:
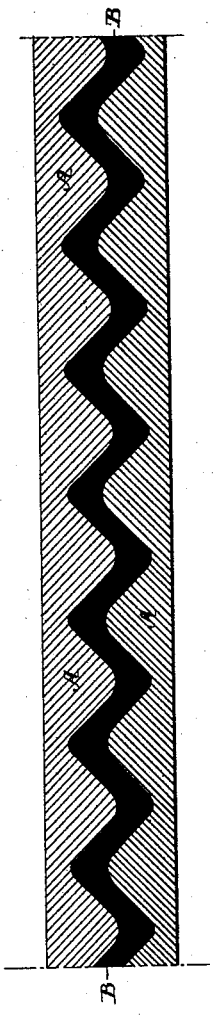
Figure 3:
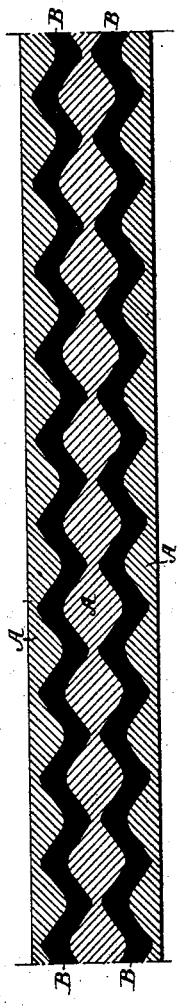

Figures 1, 2 and 3, represent respectively a two, three and five-ply plate constructed in accordance with my invention.

Referring to Fig. 1, A represents a plate of iron or low steel, and B a plate of high carbon steel, these metals being usually combined in plates for the building of burglar-proof vaults or safes so that the outer or exposed face of the plate will be composed of iron or low steel to prevent the cracking of the same by means of sledges or other tools, while the inner or interposed layer or layers of high carbon steel will present a good resistance to the tools which may be used in an attempt to form an opening in the plate. In making these compound plates the present practice is to alternate flat plates of iron or low steel and like plates of high carbon steel in the pile so that the compound plate presents flat layers or laminæ, but such a plate does not afford the best resistance to the formation of openings in it, for by using one class of tool until the first layer of iron is cut through and then substituting another class of tool for cutting through the steel, and so on, changing the tool as each successive strata is reached, an opening can be formed completely through the plate within a reasonably short time. The welding lines of the several strata being also parallel to the plane of the plate and the fiber of the same, homogeneous union is not always fully maintained under the subsequent operations of forging into shapes or re-heating and re-rolling or straightening after tempering. In carrying out my invention, therefore, I corrugate the meeting surfaces of the steel and iron plates when a two-ply plate is to be formed, as shown in Fig. 1, or corrugate the interposed steel stratum and the adjoining faces of the iron strata when a three-ply plate is being made, as shown in Fig. 2, or correspondingly corrugate the meeting surfaces of all of the strata in a five-ply plate, as in Fig. 3, or adopt the same rule in making plates having more than five plies. By this means an inclined or beveled surface of hard steel is presented to a tool after the latter has passed through a layer of iron and the point of said tool is thereby deflected so as to interfere with its proper operation, while the alternation of iron and steel on a line through the plate at or below the apex of the corrugations will interfere very materially with the action of certain tools so that the formation of an opening through the plate is rendered so difficult as to be practically incapable of accomplishment in the limited time during which a burglar would necessarily have to work. By corrugating the meeting surfaces of the steel and iron layers of the plate, moreover, a very extended undulating surface is presented for the welding action and the plate is rendered extremely homogeneous in character and consequently stronger than one in which the welding line is straight, as usual. The corrugated piling of the several strata of metal in welding the same into one homogeneous plate, moreover, so thoroughly interlocks the various strata as to make very improbable their slipping on each other or separation at the welding line during the process of re-heating, straightening or cold re-rolling.

Having thus described my invention, I claim and desire to secure by Letters Patent—

A compound plate composed of alternating plies of iron or low steel and high carbon steel welded together, said plies having their meeting surfaces corrugated, substantially as specified.

In testimony whereof I have signed my name to this specification in the presence of two subscribing witnesses.

ISAIAH W. HOYER.

Witnesses:
WILLIAM D. CONNER,
JOSEPH H. KLEIN.